(12) United States Patent
Ferri et al.

(10) Patent No.: US 11,300,931 B2
(45) Date of Patent: Apr. 12, 2022

(54) EXTERNAL ELEMENT OF METALLIC APPEARANCE HAVING AN INTEGRAL COMMUNICATION SYSTEM

(71) Applicant: The Swatch Group Research and Development Ltd, Marin (CH)

(72) Inventors: Yvan Ferri, Lausanne (CH); Loic Curchod, Lausanne (CH)

(73) Assignee: The Swatch Group Research and Development Ltd, Marin (CH)

( * ) Notice: Subject to any disclaimer, the term of this patent is extended or adjusted under 35 U.S.C. 154(b) by 485 days.

(21) Appl. No.: 16/315,843

(22) PCT Filed: Jul. 12, 2017

(86) PCT No.: PCT/EP2017/067593
§ 371 (c)(1),
(2) Date: Jan. 7, 2019

(87) PCT Pub. No.: WO2018/015249
PCT Pub. Date: Jan. 25, 2018

(65) Prior Publication Data
US 2019/0250566 A1   Aug. 15, 2019

(30) Foreign Application Priority Data

Jul. 19, 2016 (EP) .................................. 16180207

(51) Int. Cl.
*G04G 21/04* (2013.01)
*G04R 60/08* (2013.01)
*C22C 29/00* (2006.01)
*H01Q 1/27* (2006.01)
*H04W 4/80* (2018.01)

(52) U.S. Cl.
CPC ............. *G04G 21/04* (2013.01); *C22C 29/00* (2013.01); *G04R 60/08* (2013.01); *H01Q 1/273* (2013.01); *H04W 4/80* (2018.02)

(58) Field of Classification Search
CPC ........ C22C 29/00; G04G 21/04; G04R 60/08; H01Q 1/273
See application file for complete search history.

(56) References Cited

U.S. PATENT DOCUMENTS

| 4,915,736 A | 4/1990 | Claar et al. |
| 5,798,984 A | 8/1998 | Koch |

(Continued)

FOREIGN PATENT DOCUMENTS

| EP | 0322346 A2 | 6/1989 |
| EP | 1274150 A1 | 1/2003 |
| KR | 10-1414104 B1 | 7/2014 |

OTHER PUBLICATIONS

International Search Report dated Nov. 13, 2017, in PCT/EP2017/067593, filed Jul. 12, 2017.

*Primary Examiner* — David Bilodeau
(74) *Attorney, Agent, or Firm* — Oblon, McClelland, Maier & Neustadt, L.L.P.

(57) ABSTRACT

An external element of a timepiece or a piece of jewelry includes a body made of an insulating ceramic material, the body including a housing, a wireless communication system disposed in the housing, and at least one part of a surface of the external element includes a layer of metallic visual appearance, the layer being obtained by carburization, nitridation, or a combination of carburization, nitridation.

7 Claims, 3 Drawing Sheets

(56) References Cited

U.S. PATENT DOCUMENTS

| | | |
|---|---|---|
| 2004/0145975 A1 | 7/2004 | Barras et al. |
| 2004/0155818 A1 | 8/2004 | Barras et al. |
| 2006/0126438 A1* | 6/2006 | Itou ................. G04G 17/08 368/47 |
| 2007/0041275 A1 | 2/2007 | Barras et al. |
| 2010/0164818 A1* | 7/2010 | Kusunoki ............ G04R 60/12 343/718 |
| 2012/0247620 A1* | 10/2012 | Hwang ............... C23C 8/22 148/235 |
| 2012/0255652 A1* | 10/2012 | Hwang ............... C23C 8/02 148/218 |
| 2012/0320715 A1* | 12/2012 | Maruyama ............ H01Q 3/20 368/10 |
| 2017/0168462 A1* | 6/2017 | Ryu .................. G06Q 20/321 |
| 2017/0277127 A1* | 9/2017 | Tsukamoto ........ G04B 45/0076 |
| 2018/0090975 A1* | 3/2018 | Lee .................. H01Q 7/00 |
| 2019/0004481 A1* | 1/2019 | Curchod ............. C23C 18/00 |

* cited by examiner

EXTERNAL ELEMENT OF METALLIC APPEARANCE HAVING AN INTEGRAL COMMUNICATION SYSTEM

The present invention relates to an external element of a timepiece made from a first material and having a housing comprising a communication system.

TECHNOLOGICAL BACKGROUND

With the arrival of watches containing short-range wireless communication functions of the RFID type, it has become necessary to find spaces for positioning the communication systems. One solution has been to integrate these communication systems with elements of the watch, for example the case, the watch glass, the watch glass seal, or even the bezel.

However, this type of construction is impractical if these elements are made of solid metal. In fact, electromagnetic interference would severely impair, or even prevent, communication. Integrating the communication system with a non-metallic element allows interference to be avoided, but does not make it possible to have a visual appearance which would be the same as if this element were made of solid metal. The expression visual appearance is used here to denote a metallic luster and color.

Document EP 1 274 150 A1, describing an external element of a watch, of essentially annular form, adapted to the bezel of the watch, and having an opening in which an antenna of a communication system is situated, is already familiar. This external element is not only made of a metallic material, but it also has a significant impact on the design of the watch by the protuberance that it forms.

SUMMARY OF THE INVENTION

The invention has as its aim to address the shortcomings of the prior art.

For this purpose, the invention relates to an external element of a timepiece or a piece of jewelry containing a body made of an insulating ceramic material, said body being arranged to comprise a housing, characterized in that it further comprises a wireless communication system disposed in the housing, and in that at least one part of the surface of said external element has a layer of metallic visual appearance, said layer being obtained by carburization, nitridation or a combination of these two processes.

This external element has the advantage of being made from an insulating material such that it does not interfere with the wireless communication system, while containing a surface a layer having a metallic visual appearance such that said external element is consistent with the object/the bracelet on which it is mounted. The external appearance of the timepiece or the piece of jewelry is accordingly not modified in relation to a conventional piece which would not contain a communication system. It should be noted that the carburization/nitridation process modifies the electrical resistance of the surface of the external element by making this external element conductive at its surface (the ohmic resistance lies between 20 and 80 Ohms), albeit with a sufficiently fine thickness to ensure that the impact on the communication system is negligible, especially for frequencies below 1 gigahertz. Naturally, the external element itself remains insulating, apart from the surface layer.

The invention also has as its object a timepiece comprising a watch case comprising a case middle closed by a back and a watch glass and equipped with a bezel, characterized in that the bezel is an external element as described above.

In this case, the present invention makes it possible to obtain a rotating or non-rotating bezel system, which is easy to install, permitting a wireless communication function of the RFID type and not affecting the aesthetics of a conventional metal watch.

Other features of the invention are indicated in the dependent claims.

BRIEF DESCRIPTION OF THE FIGURES

The aims, advantages and characterizing features of the bezel system according to the present invention will be appreciated more clearly from the following detailed description of at least one embodiment of the invention that is given solely by way of non-exhaustive example and is illustrated by the drawings appended hereto, in which.

DETAILED DESCRIPTION

Figure 1:
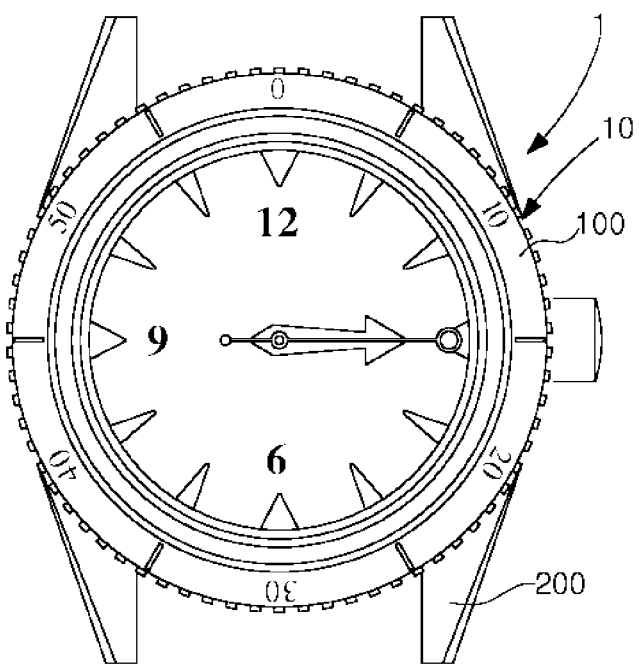
FIG. 1 represents a general view of the present invention.
Figure 2:
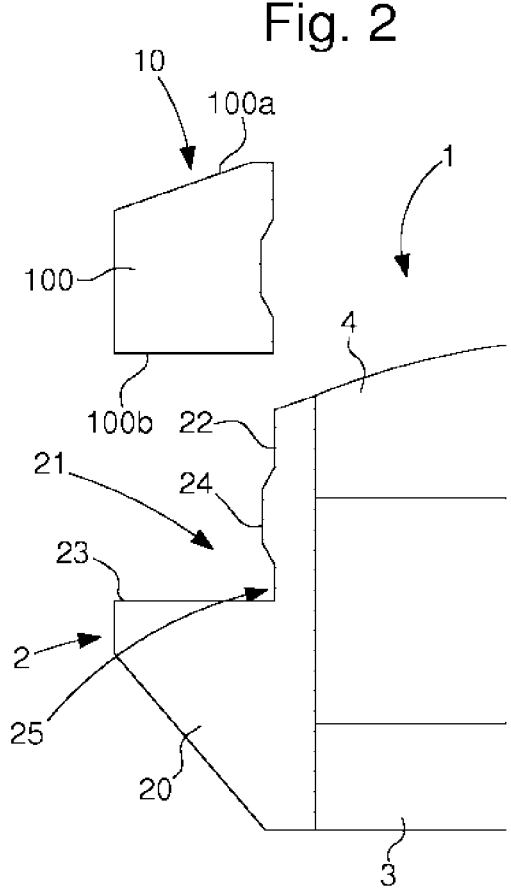
FIGS. 2 and 3 represent two detailed views of the bezel serving as is an external element according to the present invention.

FIGS. 1 and 2 depict an external element 10 such as a bezel 100 according to the invention, this bezel 100 being mounted on a timepiece 1 which comprises a watch case 2 closed by a back 3 and a watch glass 4. This bezel 100 is a component of annular form which comprises an upper face that is directly visible by the wearer and a lower face.

This bezel 100 may be mounted in a rotating or non-rotating manner at the level of the case middle. A spring-detent mechanism or latching system (not represented here) is arranged in the case of a rotating bezel 100. This spring-detent mechanism comprises spring means and a toothed element. One of the elements of the spring-detent mechanism is angularly integral with the case middle, whereas the other is angularly integral with the bezel 100, in such a way as to permit the angular indexation of the bezel in relation to the case middle.

For the mounting of the bezel 100, the timepiece comprises a case middle 20 in which a shoulder 21 is disposed, this shoulder 21 being defined by a lateral wall 22 and a base 23. This shoulder serves as a housing for the bezel. In general, the lateral wall 22 comprises a protrusion 24 extending for the entire perimeter of the lateral wall 22. This protrusion 24 allows a holding groove 25 to be defined in cooperation with the base 23 and the wall 22. This holding groove 25 makes it possible, during assembly of the bezel by force, for the latter to be inserted and held there.

Figure 3:
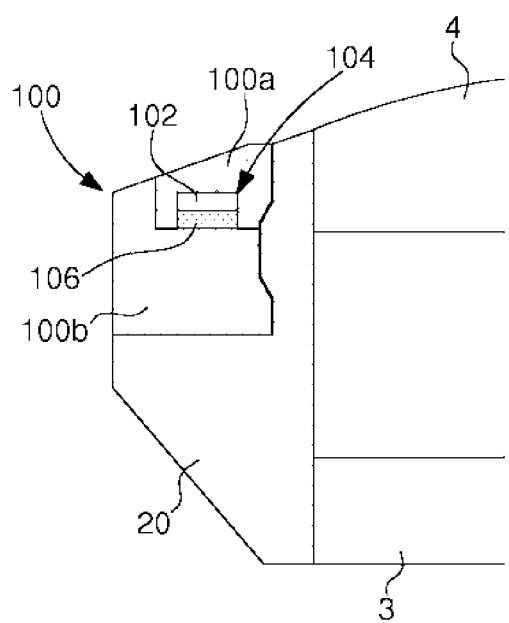

Advantageously according to the invention, the bezel 100 is equipped with a wireless communication system 102, as visible in FIG. 3.

In a preferred example, the bezel 100 is made in such a way as to comprise a body composed of a lower part 100b (principal body) and an upper part 100a (decorative insert or minutes display). This upper part 100a and this lower part 100b are thus so arranged as to be assembled to form said bezel. The lower part and the upper part are cleverly made in such a way that a groove 104 serving as a housing is present. This groove may be disposed on the upper part or on the lower part or may be formed by two complementary surfaces: one on the upper part and one on the lower part. This groove is peripheral, that is to say it extends over the periphery of the bezel, although it is not necessarily of constant dimensions. This groove 104 then serves as a housing to accommodate the wireless communication system. This wireless communication system 102 may comprise a support, that is to say a printed circuit of which the form is similar to that of the groove 104 disposed on the bezel, that is to say a ring-shaped form. In the present case, the printed circuit serves as a substrate for a loop antenna, and the different electronic components ensuring the function of the communication system are disposed there. The communication system may utilize the NFC communication protocol (Near-Field Communication).

The whole assembly is then placed in the groove 104 of the bezel 100 serving as a housing.

In order to close the whole assembly, a polymer material, for example of the rubber type, may be overmolded directly in the groove 104, forming an overmolding 106 as visible in FIG. 3. This traditional overmolding operation is intended to cover the wireless communication system 102 having a ring-shaped form in its entirety. This total covering makes it possible, on the one hand, to ensure good water-resistance of the system, since the polymer material is introduced into the whole of the groove 104, thereby preventing the liquids from being introduced there. It is also possible to fill the groove by other means, such as traditional injection, screen printing or resin distribution (in English resin dispensing). Once the groove is has been filled, the wireless communication system is retained mechanically thereby and is capable of resisting shock loadings and thermal variations without any problem.

On the other hand, a second advantage of this embodiment is that it makes fraudulent access less easy to the frequently encrypted data that are stored in the communication circuit. In fact, the communication systems 102 for this bezel 100 may utilize contact-free communication protocols of the NFC or RFID type or some other means of wireless telecommunication. This bezel may thus be utilized as an electronic 'tag' or label for product identification (or tracking). It may also be utilized for payment functions, which means that the embedded data are sensitive. Consequently, the act of overmolding a polymer on the communication system 102 makes it more difficult to retrieve information because it becomes necessary to dissolve this polymer before gaining access to the electronic circuit.

Figure 6A:
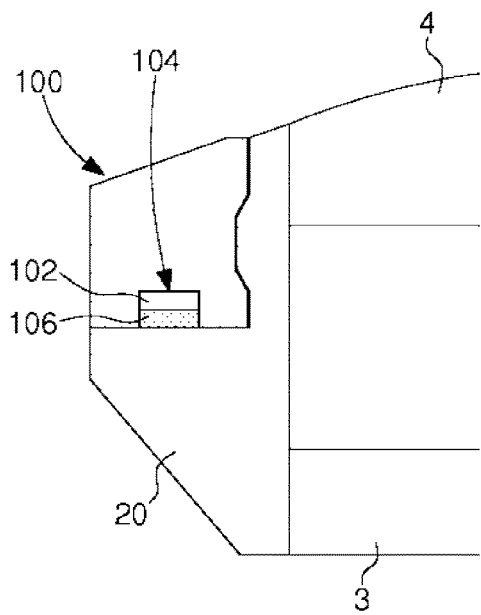
FIGS. 6A and 6B represent two other illustrative embodiments of the bezel according to the present invention.
Figure 6B:
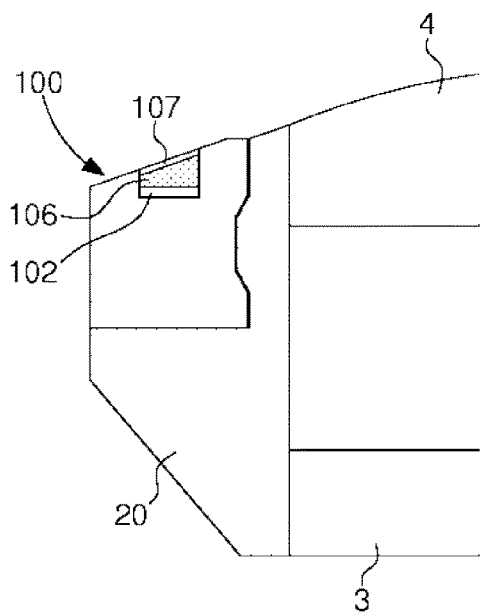

In another illustrative embodiment visible in FIGS. 6A and 6B, the bezel 100 is in the form of a single body equipped with a groove 104 serving as a housing for the wireless communication system 102. This groove 104 may be disposed on one of the faces of the body forming the bezel 100, regardless of whether it is visible or faces towards the case middle 20. In the case in which the groove 104 is disposed on one of the faces facing towards the case middle 20, the groove will be filled, for example, by an overmolding 106 of polymer, plastic or rubber in order to cover the wireless communication system 102 in its entirety and to ensure good water-resistance. In the case in which the groove 104 is disposed on one of the visible faces of the bezel, this groove accommodates the communication system 102, which is then overmolded with rubber or some other polymer. It is also possible for the groove 104 to be closed by a cover 107 made of the same material as the bezel 100 or some other material contrasting with the material of the bezel in a decorative manner. This cover may be glued or pressed or even brazed onto the bezel.

According to the invention, the bezel 100 is made in such a way as to prevent interference with the wireless communication system 102. In fact, the mounting of the communication system in a metal bezel, for example made of steel, leads to malfunctions of said communication system due to the screening of the electromagnetic fields (EM) by the metal material of the bezel.

The invention thus proposes to make the bezel from an electrically insulating material, while exhibiting a metallic appearance on all or at least a part of its visible surface. The selected material in this case is a ceramic material. A suchlike material is selected for its insulating properties preventing all interference with the wireless communication. However, this material is also selected for its mechanical resistance to scratching, both for its more noble side and for a plastic material, which may also be envisaged.

The lower part and the upper part are thus made from a ceramic material.

Cleverly, the bezel receives a treatment allowing it to have an appearance similar to that of the watch case. In fact, the watch case made of a metallic material has a metallic appearance, whereas the ceramic utilized for the external element, in this case a bezel, has a totally different appearance, which may detract from the overall aesthetics of the product. This treatment thus confers a metallic appearance to the surface of the ceramic bezel. Said metallic appearance is accompanied by metallic properties, in particular a non-zero, yet sufficiently low conductivity and with a sufficiently thin thickness to permit the passage of the electromagnetic waves received and/or emitted by the wireless communication system housed in the bezel.

Figure 4:
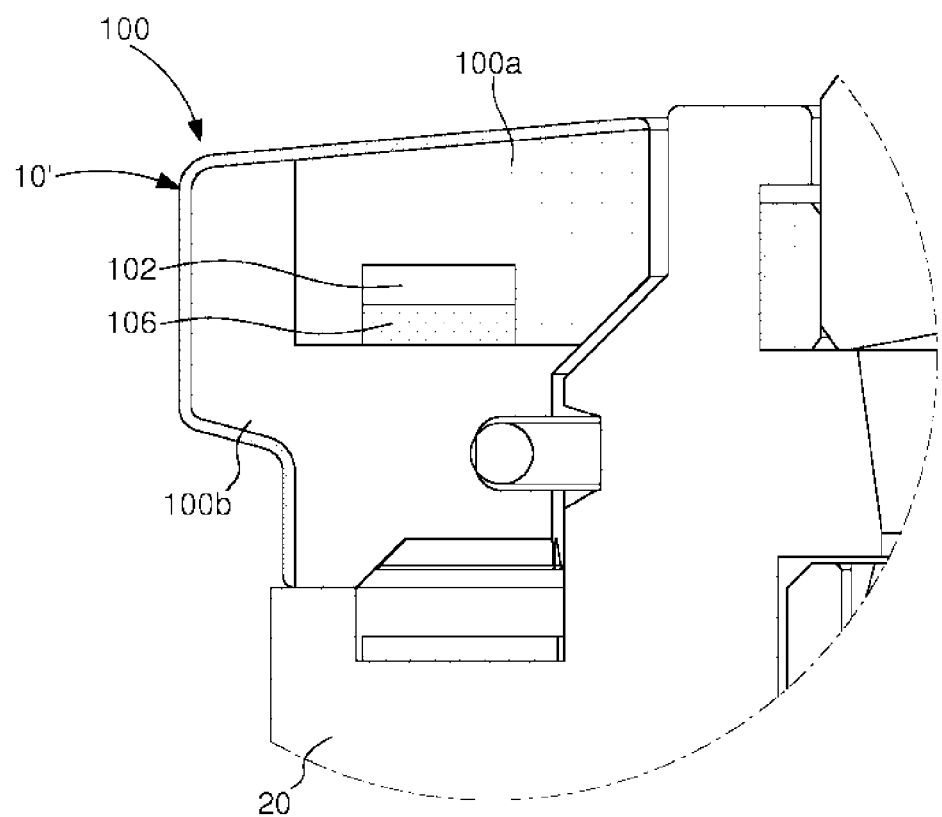
FIG. 4 represents a first embodiment of the present invention.

In a first embodiment visible in FIG. 4, the treatment of the external element 10 is a carburization or nitridation treatment. A suchlike carburization/nitridation stage involves modifying the chemical composition of the component (by replacing the oxygen of the original ceramic material by carbon or by nitrogen, respectively). A suchlike method thus involves placing the component to be carburized/nitrided, for example the bezel 100 constituted by one part or two parts 100a and 100b, in an enclosure of which the atmosphere contains atoms of carbon or nitrogen respectively, and activating the surface of the piece to be carburized/nitrided by heating uniformly over the whole of its surface or in selected zones 10'. The surface of the external element 10 is then heated to a temperature between 700 and 1100° C. for a period of 30 to 180 minutes. Under the effect of this temperature, the atoms of carbon or nitrogen in the atmosphere of the enclosure combine with the ceramic in the zones 10' of the external element 10. Advantageously, this involves a transformation of the surface of the zones 10' of the external element 10 to a certain thickness of carbide or nitride having a metallic appearance in a color close to that of platinum or gold, respectively, without the risk of deterioration by peeling, as could be the case of a metal deposition.

More specifically, the surface layer 10', which has the structure of zirconium carbide or zirconium nitride, extends from the surface for an average depth between 10 and 200 nm. This thickness has the advantage of providing the external element 10 with a metallic appearance, while being sufficiently fine to avoid interference with the wireless communication system.

Figure 5:
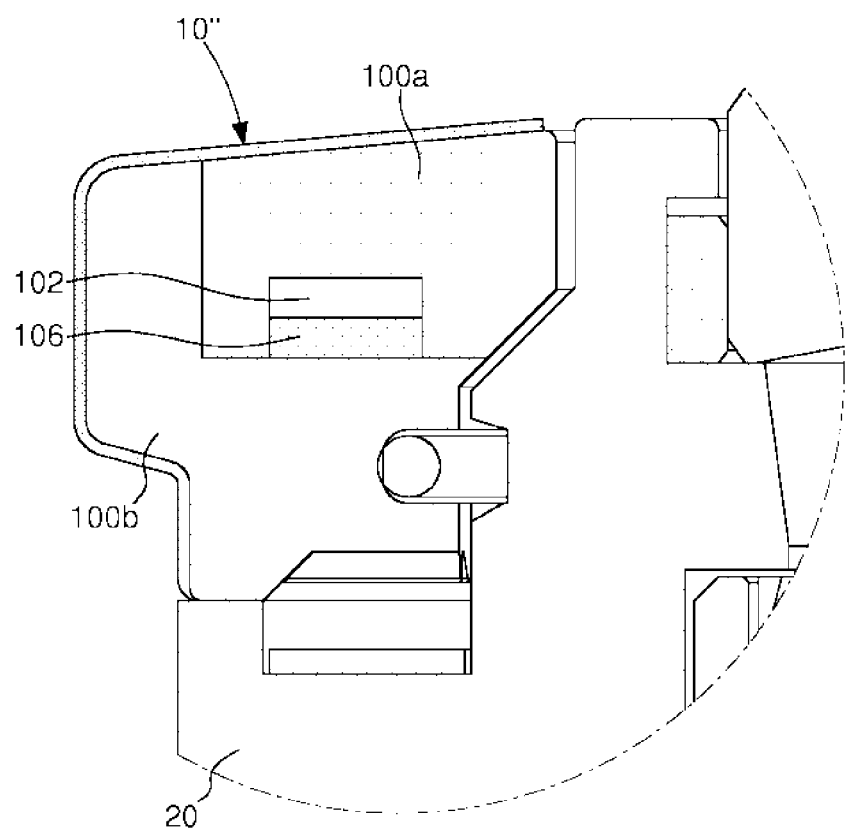
FIG. 5 represents a second embodiment of the present invention.

In a second embodiment, visible in FIG. 5, the treatment permitting the external element 10 to have a metallic appearance involves depositing a layer 10". This deposited layer is a metallic layer, an oxide layer, a nitride layer, a carbide layer, a boride layer or a combination thereof at the ceramic surface of the external element 10 produced by layer deposition by a wet-laid method or under a controlled atmosphere, preferably PVD. This layer will have a thickness of about 10 nm to 2-3 µm.

In a variant of these two embodiments, it will be appreciated that the treatment of the external element may be performed on the totality of the surface of the external element or may be only partial. In the case that the treatment is partial, the treatment is performed on the surface of the external element that will be visible to the wearer. For a bezel, in fact, a part of the surface faces towards the shoulder of the watch case, whereas the other part of the surface is visible by the wearer. Also, the selectivity of the treatment of the external element may have an aesthetic purpose, for example, in order to display indexes, numerals, a logo or some other decorative element.

It will be appreciated that various modifications and/or improvements and/or combinations that are obvious to a person skilled in the art may be made to the different embodiments of the invention explained above without departing from the scope of the invention defined by the appended claims.

The presence of a joint between the lower part and the upper part of the bezel may thus be proposed in order to improve the water-resistance.

It will also be appreciated that the external element may be a bracelet link, the back of a watch case or any other ceramic external component containing a wireless communication system.

The invention claimed is:

1. An external bezel of a timepiece or a piece of jewelry comprising:
   a body made of an insulating ceramic material, the body comprising a groove inside of the body;
   a wireless communication system disposed in the groove of the body,
   wherein at least one part of a surface of the external bezel includes a layer of metallic visual appearance, and the layer of metallic visual appearance is obtained by carburization or nitridation, or a combination of carburization and nitridation, and
   wherein the body of the external bezel comprises a lower part and an upper part being combined to form the external bezel, the lower part and the upper part are configured such that the groove is completely surrounded by the body.

2. The external bezel as claimed in claim 1, wherein the layer of metallic visual appearance has a thickness between 10 and 2000 nm.

3. The external bezel as claimed in claim 1, wherein the layer of visual metallic appearance has a thickness between 10 and 200 nm.

4. The external bezel as claimed in claim 1, wherein the groove is ring-shaped and the wireless communication system is ring-shaped.

5. The external bezel as claimed in claim 1, further comprising a polymer material that fills the groove after the wireless communication system is disposed in the groove.

6. A timepiece comprising:
   a watch case comprising a case middle closed by a back and a watch glass comprising the external bezel according to claim 1.

7. The timepiece as claimed in claim 6, wherein the case middle comprises a shoulder defined by a lateral wall and a base, and in which the bezel is disposed.

* * * * *